Jan. 21, 1930.  S. F. DAVENPORT  1,744,366

SWIVEL ATTACHMENT FOR FISH HOOKS

Filed Dec. 22, 1927

Inventor
S. F. Davenport.

By
Eccleston & Eccleston,
Attorneys

Patented Jan. 21, 1930

1,744,366

UNITED STATES PATENT OFFICE

SAM F. DAVENPORT, OF AUBURN, INDIANA, ASSIGNOR TO THE CREEK CHUB BAIT CO., OF GARRETT, INDIANA

SWIVEL ATTACHMENT FOR FISH HOOKS

Application filed December 22, 1927. Serial No. 241,789.

This invention relates to means for attaching fish hooks to lures so as to provide a strong and durable anchoring means for the hooks thereby adapting them for use where a considerable strain is liable to be placed upon the hooks.

It is also an object of the invention to swivel the hooks to the lure so as to avoid any possibility of the fish tearing the hook from its mouth by a leverage action against the body of the lure.

A further object of the invention resides in the provision of a swivel which is adapted for anchoring tail hooks as well as those which are suspended from the main body of a lure.

Figure 1:
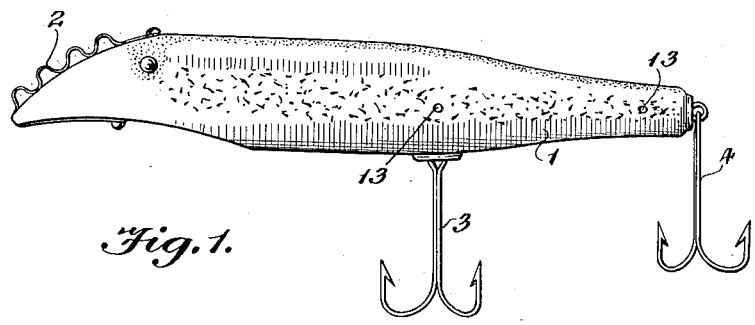

Other objects and advantages of the invention will be apparent from the following description when taken in connection with the accompanying drawing, in which, Figure 1 is a side elevational view of a lure having the novel form of anchoring means incorporated therein.

Figure 3:
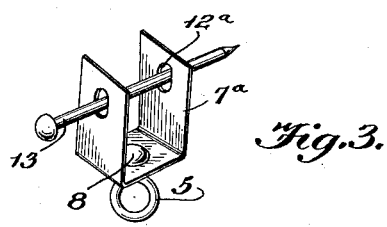
Figure 4:
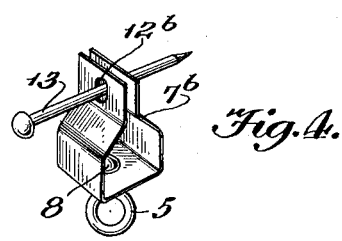
Figure 2:
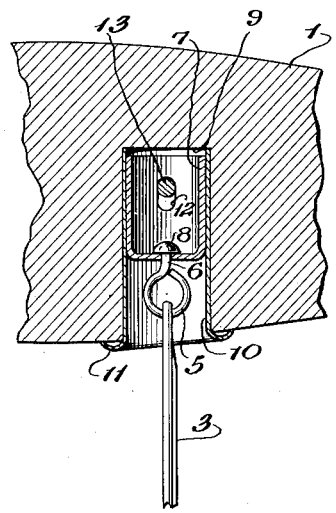
Figure 5:
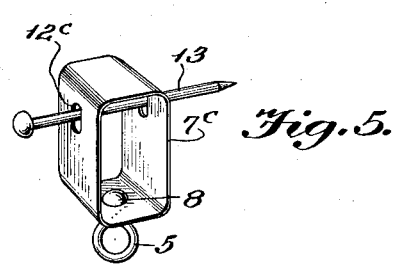

Figure 2 is a fragmentary vertical sectional view through the lure of Figure 1, showing the preferred construction of swivel, and Figures 3, 4 and 5 are perspective views of modified forms of swivels per se.

Referring to the drawing in more detail, the numeral 1 designates a lure body of any conventional form, preferably formed of wood and designed to simulate the appearance of a small fish. Any conventional form of line securing means 2 may be applied to the forward end of the body portion, and the gang hooks 3 and 4 are swivelly connected to the underside of the body portion about midway of the length thereof and to the tail portion, respectively. It is to be understood however, that while gang hooks are depicted herein, the invention for swivelling the hooks is equally well adapted for use with individual hooks.

As more clearly indicated in Figure 2, the hook 3 is attached to a ring 5 provided with a shank 6 which is inserted through a hole in the bottom of the cylindrical shell or thimble 7 and is provided with a head 8, thereby swivelly connecting the hook to the thimble. The body 1 of the lure is provided with a recess or cavity 9 to receive the swivel connection and in the form shown is of such depth as to bring the fastening means to be described at about the center-line of the lure. Mounted within the cavity 9 is a sleeve or bushing 10, preferably but not necessarily flanged at its lower end as indicated at 11, so as to provide a finish for this part of the lure. Elongated or oval slots 12 are provided at diametrically opposite points in the bushing 10 and thimble 7 for the reception of a pin, screw, or the like 13, which is passed transversely through the body of the lure.

It will be understood of course that the outer sleeve 10 is not an essential part of the invention, but where used it is provided with the elongated slots 12 to facilitate alignment of the slots in the thimble 7 so as to permit the anchoring pin 13 to more readily pass into the lure. Should the hook become bent or otherwise damaged the same may be easily removed for repair or replacement by merely withdrawing the pin 13 from the lure and then removing the thimble 7 from within the recess 9.

The anchoring means as described provides a positive lock for the hooks which will preclude the accidental separation of the hooks from the lure body, but will nevertheless permit a free swivelling action of the hooks which not only prevents any leverage action of the hook against the lure body which would otherwise aid the fish in tearing the hook from its mouth, but also avoids damage to the finish of the lure by reason of the hook points coming in contact therewith. This latter advantageous result is due in part to the fact that the swivel connection is well within the recess 9 so that the walls of the recess will serve as a stop to limit movement of the points of the hook toward the body of the lure.

In Figures 3, 4 and 5, I have shown several constructions of thimbles indicated by reference characters 7ª, 7ᵇ and 7ᶜ, and which may be used in lieu of the thimble 7 (Figure 2) if desired. In Figures 3 and 4 the thimbles are formed from flat strips of metal bent up to the form shown and provided with the elongated openings 12ª and 12ᵇ. In Figure 5 the thimble 7ᵉ is formed by flattening portions of a metal ring and punching the elongated slots 12ᵉ. The last form of thimble is well adapted for use where an outer sleeve such as sleeve 10 is omitted from the construction.

In each of these modified constructions the hook is swivelled to the bottom of the thimble in the identical manner heretofore described in connection with the disclosure of Figure 2, and a repetition of the description is not deemed necessary. It may also be mentioned that in each of the forms disclosed herein the outer sleeve or bushing 10 may be omitted and a simple eyelet used in place thereof to provide a finish for the attaching means.

From the foregoing description it will be apparent that I have devised a simple and inexpensive construction for attaching hooks to a lure, which is strong and durable and therefore especially adapted for use in connection with large fish; that the provision of the swivel connection avoids any liability of a leverage action between the hook and lure whereby the hook might be torn from the mouth of the fish; that the structure is well adapted to facilitate removal of a damaged hook for repair or replacement; and that the construction is such as will prevent injury to the finish of the lure by reason of the points of the hooks coming in contact therewith.

In accordance with the patent statutes I have described what I now believe to be the preferred embodiments of the invention, but it will be understood that the invention is susceptible of various minor changes in construction and all such are intended to be included within the scope of the appended claims.

What I claim as new and desire to secure by Letters Patent is:

1. An artificial bait including a recessed body portion, a hook, a member to which said hook is swivelly connected, and a pin extending through said member and body portion to secure the latter to the former.

2. An artificial bait including a recessed body portion, a hook, a thimble provided with elongated slots and mounted within said recess, means connecting the hook to the thimble, and a pin extending through said body portion and the slots of said thimble.

3. An artificial bait including a recessed body portion, a bushing in said recess, a hook, a thimble provided with elongated slots and mounted within said recess, means for swivelly connecting the hook to the thimble, and a pin extending transversely through said body portion and the slots of said thimble.

SAM F. DAVENPORT.